United States Patent [19]

Hayakawa et al.

[11] Patent Number: 4,823,648
[45] Date of Patent: Apr. 25, 1989

[54] HYDRAULIC CONTROL SYSTEM FOR FOUR-WHEEL DRIVE TORQUE TRANFER MECHANISM FOR VEHICLE

[75] Inventors: Yoichi Hayakawa, Toyoake; Yasunobu Ito, Aichi, both of Japan

[73] Assignee: Aisin Warner Kabushiki Kaisha, Aichi, Japan

[21] Appl. No.: 427,049

[22] Filed: Sep. 29, 1982

[30] Foreign Application Priority Data

Sep. 30, 1981 [JP] Japan .................................. 56-156431

[51] Int. Cl.⁴ ........................................... B60K 41/22
[52] U.S. Cl. ................... 74/869; 74/152 C; 74/868; 180/247
[58] Field of Search ............... 74/740, 752 C, 867, 74/868, 869; 180/247

[56] References Cited

U.S. PATENT DOCUMENTS

| | | | |
|---|---|---|---|
| 3,352,373 | 11/1967 | Tuck | 180/247 X |
| 3,865,207 | 2/1975 | Schwab et al. | 180/247 X |
| 3,963,085 | 6/1976 | Vinton | 180/247 |
| 3,988,951 | 11/1976 | Mair et al. | 74/869 X |
| 4,274,303 | 6/1981 | Shindo et al. | 74/740 |
| 4,292,860 | 10/1981 | Kako et al. | 74/665 GA |
| 4,298,085 | 11/1981 | Moroto et al. | 180/247 |
| 4,369,671 | 1/1983 | Matsumoto et al. | 74/869 X |
| 4,417,642 | 11/1983 | Suzuki et al. | 180/249 |
| 4,422,349 | 12/1983 | Matsumoto et al. | 180/247 X |

FOREIGN PATENT DOCUMENTS 103149 8/1980 Japan .................................. 74/740

Primary Examiner—William F. Pate, III
Assistant Examiner—Dwight G. Diehl
Attorney, Agent, or Firm—Blum Kaplan

[57] ABSTRACT

A hydraulic control system for a four-wheel drive torque transfer mechanism for a vehicle, including an automatic transmission, a transfer mechanism having a two-wheel drive direct-coupling gear ($H_2$), a four-wheel drive direct-coupling gear ($H_4$) and a reduced-speed four-wheel drive gear ($L_4$) and a hydraulic control circuit for controlling the transmission and the transfer mechanism. The transfer mechanism includes a reduction gear mechanism, a first output shaft, a second output shaft connected to the first output shaft by means of a linkage, a four-wheel drive clutch for rotatably connecting and disconnecting the first and second output shafts, a direct-coupling clutch for connecting and disconnecting the input shaft of the reduction gear mechanism and the first output shaft and a reduction brake for shifting the reduction gear mechanism into the reduced-speed mode. The hydraulic control circuit includes a modulator valve capable of supplying a fluid of a reduced pressure when the transfer mechanism is established in the four-wheel drive direct-coupling gear so that the coupling torque of the four-wheel drive clutch is reduced and supplying a fluid of an increased pressure when the transfer mechanism is established in the reduced-speed four-wheel drive gear so that the coupling torque of the four-wheel drive clutch is increased.

7 Claims, 5 Drawing Sheets

HYDRAULIC CONTROL SYSTEM FOR FOUR-WHEEL DRIVE TORQUE TRANFER MECHANISM FOR VEHICLE

BACKGROUND OF THE INVENTION

The present invention relates to a hydraulic control system for a four-wheel drive torque transfer mechanism having a two-wheel drive direct-coupling gear, four-wheel drive direct-coupling gear and reduced-speed four-wheel drive gear.

A typical torque transfer mechanism of this type is connected to the output shaft of the transmission of a power source and is adapted to distribute power to the front axle and the rear axle of a vehicle through the output shafts thereof. While a four-wheel drive vehicle equipped with such a transfer mechanism is running straight ahead, the output shafts of the transfer mechanism for distributing driving force to the front and the rear axles are connected with each other through power transmitting means, such as gears, chains or belts, at a predetermined ratio of revolving rate. When this vehicle is turned by controlling the steering wheels, usually, the front wheels (the front wheels are supposed to serve as steering wheels, hereinafter, in this specification), differential rotation between the respective output shafts of the transfer mechanism for driving the front axle and the rear axle is required, since the turning radius of the front wheels is greater than that of the rear wheels.

Accordingly, a conventional transfer mechanism of this type comprises a differential gear mechanism in the transfer gear unit, whereby either the output shaft for the front axle or the output shaft for the rear axle is directly connected to the output shaft of the transmission while the other output shaft of the transfer mechanism is connected to the aforementioned output shaft through a differential gear mechanism. A vehicle equipped with such a driving mechanism is liable to fail running when one of the wheels fails to keep the traction resulting from bad contact with the ground during four-wheel drive running, since differential gear mechanisms are mounted on the front axle and the rear axle, respectively. In order to avoid such running inability of the vehicle, a viscous control coupling is formed in the differential mechanism of the transfer gear unit between the two output shafts thereof or a so-called limited slip differential mechanism is employed so that at least some torque of a magnitude can be transmitted to the four wheels.

However, it is usual to provide in the transfer gear unit an additional mechanism capable of locking the driving train connected to the front and the rear axles to attain nonslip rotation, since there still remains the possibility of slipping in case of insufficient torque transfer capacity of the mechanism even when the viscous control coupling or the nonslip differential mechanism is employed. Although the safety and the durability of the transfer mechanism are increased and the riding comfortableness of the vehicle is improved through the provision of the differential mechanism, viscous control coupling or limited slip mechanism, and the locking mechanism, the cost of the vehicle increases.

SUMMARY OF THE INVENTION

Generally speaking, in accordance with the present invention, a hydraulic control system especially suitable for protecting a transfer mechanism and output shafts for transmitting the torque to the wheels, is provided. The present invention relates to a hydraulic control system for a torque transfer mechanism including a reduction gear mechanism, four-wheel drive frictional engagement means, direct-coupling frictional engagement means and reduced-speed drive frictional engagement means and capable of being shifted into gear positions of a two-wheel drive direct-coupling range, a four-wheel drive direct-coupling range and a reduced-speed four-wheel drive range. The hydraulic control system of the present invention includes means to reduce the coupling torque of the four-wheel drive frictional engagement means when the transfer mechanism is shifted into the four-wheel drive direct-coupling range and to increase the coupling torque of the four-wheel drive frictional engagement means when the transfer mechanism is shifted into the reduced-speed four-wheel drive range.

More particularly, the four-wheel drive torque transfer mechanism includes a reduction gear mechanism having an input shaft connected to the output end of an automatic transmission, a first output shaft connected to the output end of the reduction gear mechanism, a second output shaft rotatably connected or disconnected to the first output shaft through a linkage and the four-wheel drive frictional engagement means, the direct-coupling frictional engagement means for directly engaging and disengaging the input shaft of the reduction gear mechanism and the first output shaft and the reduced-speed frictional engagement means for setting the reduction gear mechanism in the mode of a high reduction ratio (reduced speed mode).

The hydraulic control system includes first control valve means for supplying pressurized fluid to and draining pressurized fluid from the servomotor of the four-wheel drive frictional engagement means and second control valve means which operates selectively to supply pressurized fluid either to the servomotor of the direct-coupling frictional engagement means or to the servomotor of the reduced-speed drive frictional engagement means and to drain the other.

The hydraulic control system includes further third control valve means. The third control valve means is provided in a conduit connecting the servomotor of the four-wheel drive frictional engagement means and the first control valve means, for controlling the sectional area of the conduit feeding the pressurized fluid into and draining from said servomotor on the basis of the fluid pressure working within the servomotor of the reduced-speed drive frictional engagement means, which is applied thereto.

Accordingly, it is an object of the present invention to provide an improved four-wheel drive torque transfer mechanism for a vehicle, which ensures reliable operation of the transfer mechanism.

Another object of the present invention is to provide a hydraulic control system, for a four-wheel drive torque transfer mechanism which is connected to the rear end of an automatic transmission, has a reduction gear mechanism, direct-coupling frictional engagement means, reduced-speed drive frictional engagement means and four-wheel drive frictional engagement means and is capable of being shifted into gear positions of a two-wheel drive direct-coupling mode, four-wheel drive direct-coupling mode and reduced-speed four-wheel drive mode, including means to reduce the coupling torque of the four-wheel drive frictional engagement means, which engages in the four-wheel drive mode and disengages in the two-wheel drive mode, when the transfer mechanism is shifted into the gear position of the four-wheel drive direct-coupling mode and to increase sufficiently the coupling torque of the same when the transfer mechanism is shifted into the gear position of the reduced-speed four-wheel drive mode so that a tortional force resulting from a differential in revolving rate between the front and rear axles is absorbed through the slipping operation of the four-wheel drive frictional engagement means in the four-wheel drive direct-coupling mode, whereas a sufficient four-wheel driving force is provided in the reduced-speed four-wheel drive mode, and thus capable of controlling the transfer mechanism to allow the front and rear wheels to secure driving force corresponding to the running condition during four-wheel drive running, whereas reducing the four-wheel drive transfer mechanism to an extremely simple constitution.

A further object of the present invention is to provide a hydraulic control system, for a four-wheel drive torque transfer mechanism which is connected to the rear end of an automatic transmission, has a reduction gear mechanism, direct-coupling frictional engagement means, reduced-speed frictional engagement means and four-wheel drive frictional engagement means and is capable of being shifted into gear positions of a two-wheel drive direct-coupling mode, four-wheel drive direct-coupling mode and reduced-speed four-wheel drive mode, capable of reducing the coupling torque of the four-wheel drive frictional engagement means, which engages in the four-wheel drive mode and disengages in the two-wheel drive mode, when the transfer mechanism is shifted into the gear position of the four-wheel drive direct-coupling mode and sufficiently increasing the coupling torque of the same when the transfer mechanism is shifted into the gear position of the reduced-speed four-wheel drive mode.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF PREFERRED EMBODIMENTS

Figure 2:
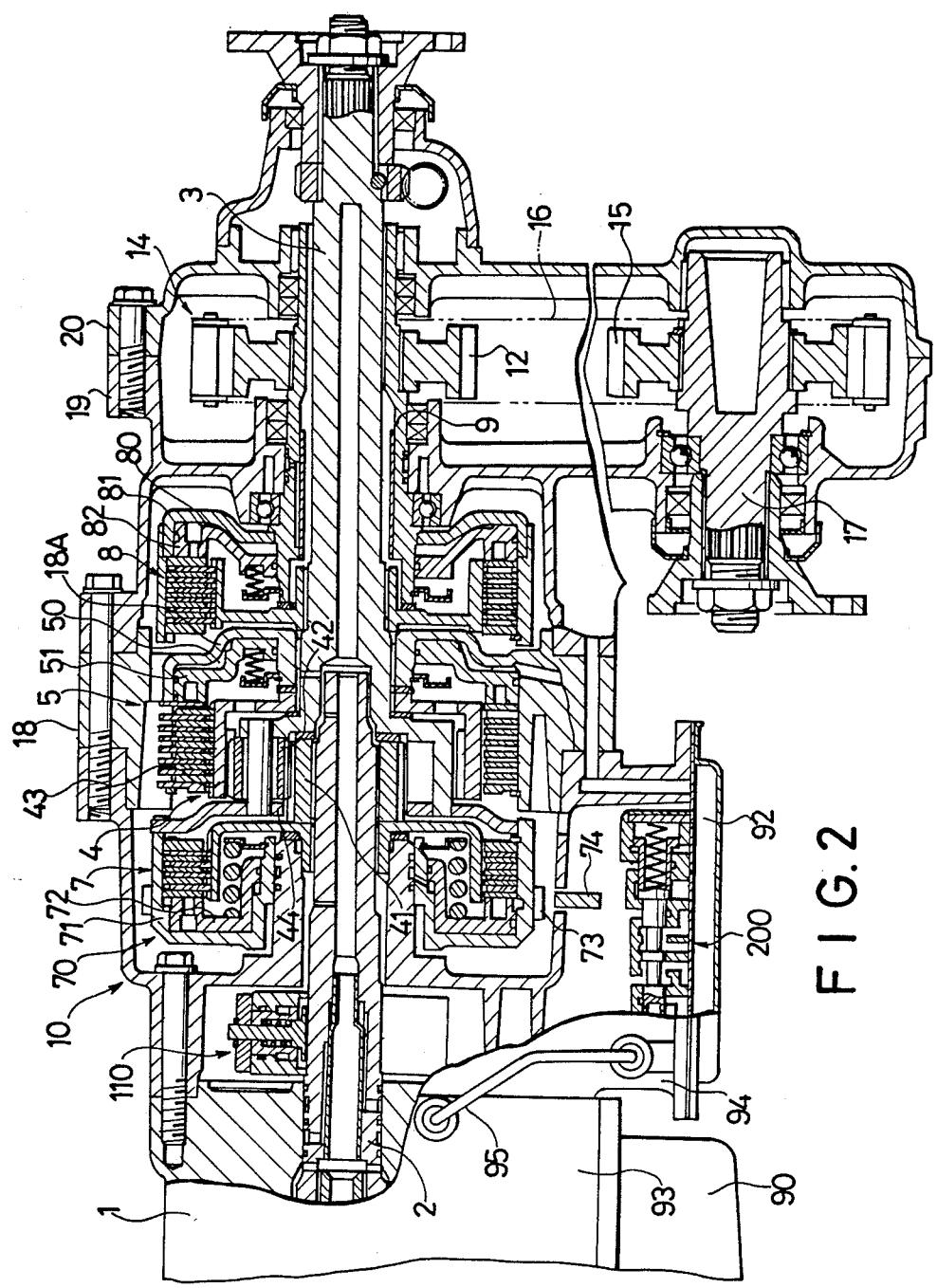
FIG. 2 is a detailed sectional view of the power transmission system of FIG. 1.

Hereafter, the invention is illustrated more particularly by way of the preferred embodiments shown in the drawings, in which generally indicated at 1 is a transmission gear assembly of the automatic transmission and at 10 a torque transfer mechanism which is connected to the output end (the right end in FIG. 2) of the transmission gear assembly through a shaft 2 which serves as an output shaft of the transmission gear assembly 1 and at the same time as an input shaft of the torque transfer mechanism 10. Denoted at 3 is a first output shaft of the transfer mechanism 10, which is located behind the input shaft 2 (on the right side in FIG. 2) in series therewith, at 110 a governor valve which is securely mounted on the input shaft 2, and at 4 a planetary gear set including a sun gear 41 which is secured by a spline on a rear portion of the input shaft 2, planetary pinions 42 in meshing engagement with the sun gear 41, a ring gear 43 in meshing engagement with the planetary pinions 42, and a carrier 44 rotatably retaining the planetary pinions 42 and coupled with the fore end of the first output shaft 3 of the transfer mechanism. Designated at 5 is a friction brake for engaging and disengaging the ring gear 43 with a first transfer case 94, and at 50 a hydraulic servomotor for the brake 5, which is constituted by a cylinder 18A formed in a second transfer case 18 and a piston 51 slidably fitted in the cylinder 18A. The sun gear 41 and carrier 44 are coupled and uncoupled by a hydraulic servomotor 70 which is at one end of the planetary gear set 4 on the side of the transmission gear assembly and which is constituted by a cylinder 71 connected to the carrier 44 and a piston 72 fitted in the cylinder 71. Denoted at 8 is a friction clutch for engaging and disengaging the first output shaft 3 and a sleeve 9 connected to one sprocket wheel 12 of a link mechanism which drives the other output shaft of the transfer mechanism as will be described hereinafter. The reference numeral 80 indicates a hydraulic servomotor constituted by a cylinder 81 welded to the sleeve 9, which is rotatably retained in a third transfer cases 19 and a fourth transfer case 20, and a piston 82 slidably fitted in the cylinder 81. Further designated at 17 is the second output shaft of the transfer mechanism, and at 14 a link mechanism which is constituted by the sprocket wheel 12 secured by a spline to the sleeve 9, a sprocket wheel 15 secured by a spline to the second output shaft 17, and a chain 16 lapped between and around the two sprocket wheels.

Provided around the circumference of the hydraulic cylinder 71 of the friction clutch 7 is a parking gear 73 with which a stopper 74 is engaged when the shift lever of the automatic transmission is put in the parking position, thereby fixing the first output shaft 3.

Indicated at 90 is an oil pan of the automatic transmission, at 200 a hydraulic control system which controls the oil pressure flows to and from the hydraulic servomotors 70, 80 and 50 of the clutches 7 and 8 and the brake 5 of the four-wheel transfer mechanism 10, and at 92 an oil pan of the hydraulic control system 200. The oil pressure to be supplied to the hydraulic servomotors of the clutches 7 and 8 and brake 5 is fed through a pipe 95 which is supported on a case 93 of the automatic transmission and the first transfer case 94 and through the hydraulic control system 200 from the oil pan 90.

Figure 1:
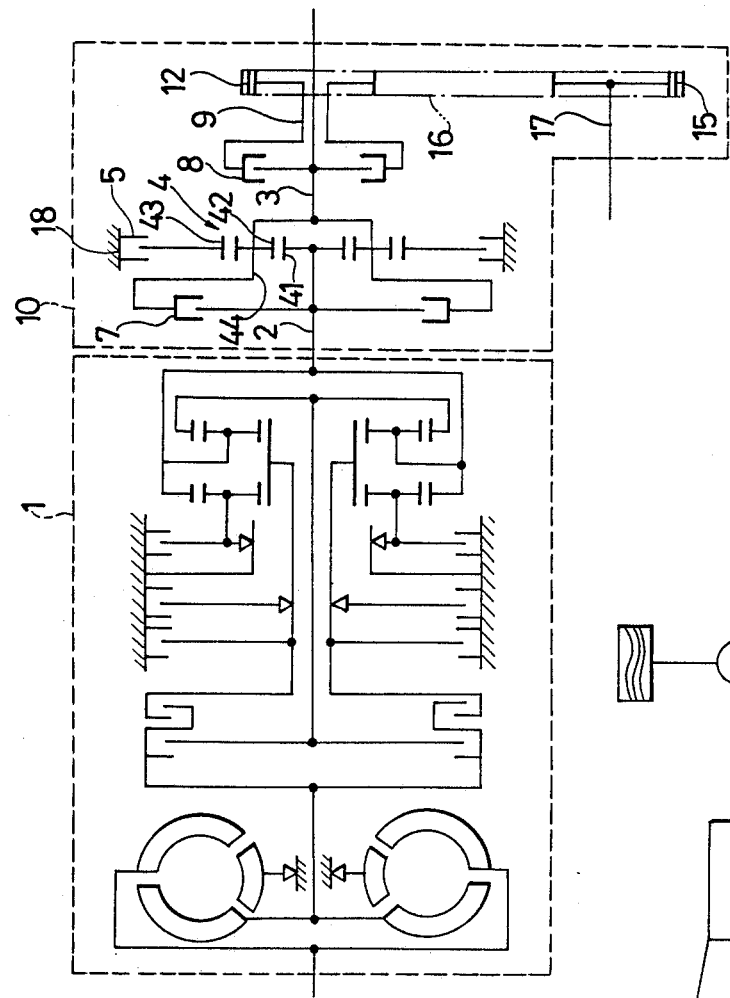
FIG. 1 is a schematic illustration of a power transmission system embodying the present invention, in which a transfer mechanism of the present invention is connected to the output end of a known automatic transmission.
Figure 3:
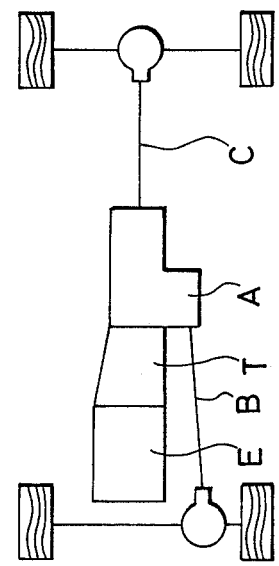
FIG. 3 is a schematic illustration of a power transmission system of a vehicle.

As indicated at A in FIG. 3, the transfer mechanism is assembled with an automatic transmission T which is connected to an internal combustion engine E of a motor vehicle, with its first output shaft 3 connected to a rear wheel propeller shaft C and the other or the second output shaft 17 to a front wheel propeller shaft B. In a normal cruising operation, the line pressure which is supplied to the hydraulic control circuit of the automatic transmission is fed to the hydraulic servomotor 70 to engage the clutch 7, while the hydraulic servomotors 50 and 80 are drained to hold the brake 5 and clutch 8 in released state. Consequently, the sun gear 41 and carrier 44 of the planetary gear set 4 are coupled to transmit power to the first output shaft 3 from the input shaft 2 in a reduction ratio of 1 for operation in rear two-wheel drive. In this instance, the power from the input shaft 2 is transmitted to the first output shaft 3 from the carrier 44 through clutch 7, by-passing the gears 41 to 43 which therefore receive no load on their tooth faces and can have a prolonged service life. If it is desired to switch the mode of operation from two-wheel drive to four-wheel drive, a selector lever or switch which is provided in the driver's cabin is manipulated for manual shift, actuating the hydraulic control system 200 of the transfer mechanism whereupon the line pressure is supplied gradually to the hydraulic servomotor 80 to engage the clutch 8 smoothly. As a result, the first output shaft 3 is connected with the sleeve 9 to transmit the power also to the front wheels through the link mechanism 14, second output shaft 17 and propeller shaft B to operate the vehicle in the four-wheel drive mode transmitting the power of the input shaft 2 in a reduction ratio of 1 to the first output shaft 3 which drives the front wheels as well as to the second output shaft 17 which drives the rear wheels. If a greater output torque is required for hill climbing or other reasons during operation in the four-wheel drive mode, the oil pressure to the hydraulic servomotors actuates an inhibitor valve 240, a downshift timing valve 260 and a check valve 320 to supply the line pressure gradually to the hydraulic servomotor 50 while draining the oil pressure of the hydraulic servomotor 70, thereby gradually engaging the brake 5 and at the same time releasing the clutch 7 smoothly. As a result, the sun gear 41 and carrier 44 are released and the ring gear 43 is held stationary, so that the rotation of the input shaft 2 is transmitted to the first and second output shafts 3 and 17 after reduction through the sun gear 41, planetary pinions 42 and carrier 44 to establish a four-wheel drive operation of a greater torque. Table 1 below shows the positions of the manual shift of the transfer mechanism in relation with the engaged or released states of the brake 5 and clutches 7 and 8 and the mode of operation.

TABLE 1

| Manual Shift | Mode of Operation | Frictional Engagement Means | | | Reduction Ratio |
|---|---|---|---|---|---|
| | | 5 | 7 | 8 | |
| $H_2$ range | Two-wheel drive | X | O | X | 1 |
| $H_4$ range | Four-wheel drive direct-coupling | X | O | O | 1 |
| $L_4$ range | Four-wheel drive direct-coupling | X | O | O | 1 |
| | Reduced-speed four-wheel drive | O | X | O | $\frac{1+\lambda}{\lambda} = 3.0$ |

In Table 1, the marks "O" and "X" indicate the engaged and released states of the frictional engagement means, respectively. The symbol "$\lambda$" in the reduction ratio represents the ratio in the number of teeth of the sun gear 41 to the ring gear 43, and is regarded as 0.5 in the example shown in Table 1.

Figure 4:
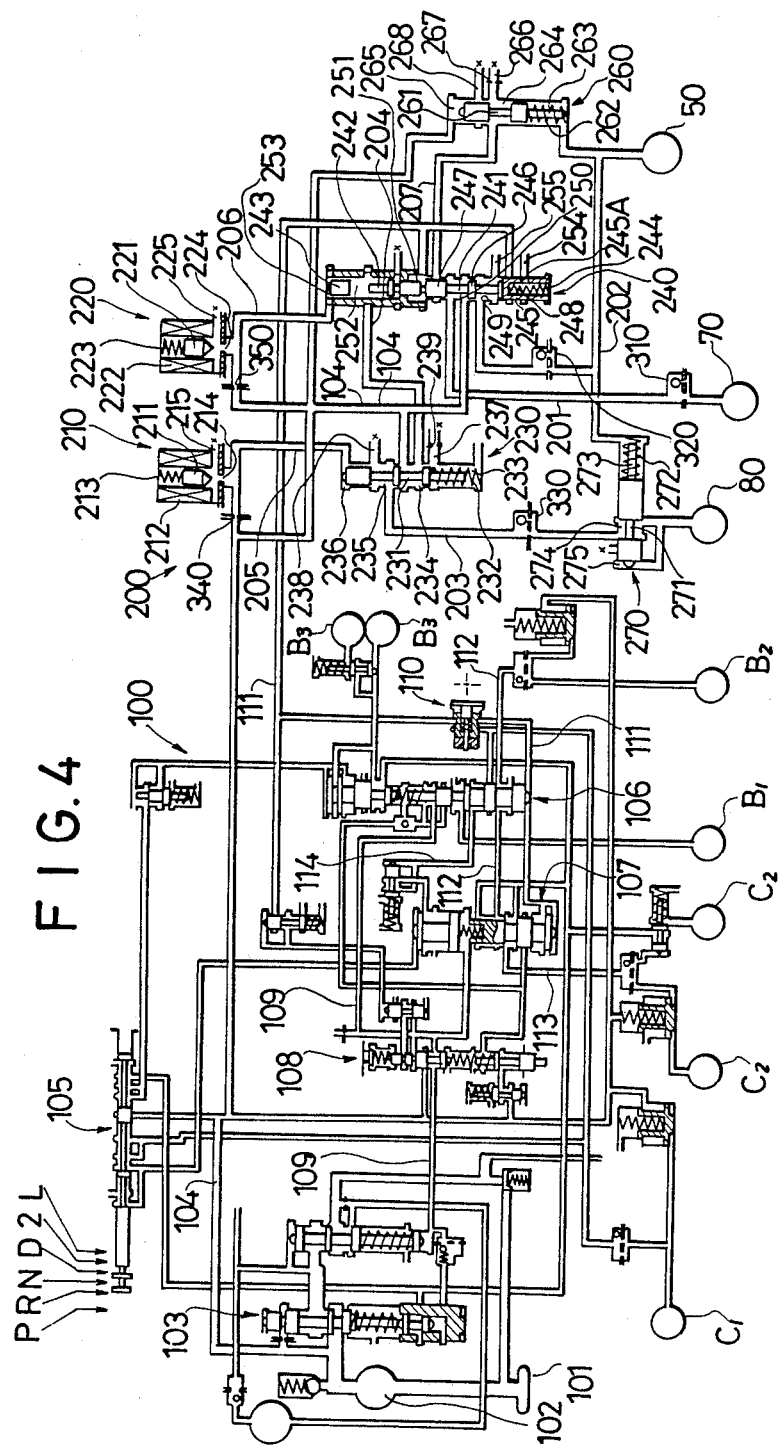
FIG. 4 is the circuit diagram of a hydraulic control system for a four-wheel drive torque transfer mechanism in accordance with the present invention as applied to an automatic transmission having three forward ranges and one reverse range.

Referring now to FIG. 4, the hydraulic control system for four-wheel drive torque transfer mechanism according to the present invention is hereafter described more particularly by way of a case where it is connected to an automatic transmission with three forward speed positions and one reverse position.

In the figure, generally designated by the reference numeral 100 is an example of known automatic transmission with three forward speed gears and one reverse gear, in which the oil taken up from an oil sump 101 by an oil pump 102 is regulated into a predetermined pressure (line pressure) at the pump output by a regulator valve 103 and delivered to a conduit 104. The oil pressure inputted to the conduit 104 is fed to a 1-2 shift valve 106 and a 2-3 shift valve 107 through a manual selector valve 105. Indicated at 108 is a throttle valve which generates an oil pressure (throttle pressure) in a conduit 109 commensurate with the degree of throttle opening. Indicated at 110 is a governor valve which generates an oil pressure (governor pressure) commensurate with the vehicle speed in a conduit 111.

The 1-2 shift valve 106 and 2-3 shift valve 107 open and close the conduits 112 to 114 according to the level of the throttle and governor pressures supplied through the conduit 109 and 111, thereby controlling the supply and discharge of oil pressure to and from the hydraulic servomotors $C_1$ to $C_2$ and $B_1$, $B_2$ of the clutches and brakes.

In the particular embodiment shown, the oil pressure is supplied to the hydraulic servomotor $C_1$ in the forward 1st speed range, to the hydraulic servomotors $C_1$ and $B_2$ in the forward 2nd speed range, to hydraulic servomotors $C_1$, $C_2$ and $B_2$ in the forward 3rd speed range, and to the hydraulic servomotors $C_2$ and $B_3$ in the reverse range.

The hydraulic control system 200 for the four-wheel drive torque transfer mechanism includes a first solenoid valve 210, a second solenoid valve 220, a changeover valve 230, an inhibitor valve 240, downshift timing valve 260, a first conduit 201 communicating with the hydraulic servomotor 70 for the direct-coupling frictional engagement means or the multiple disc clutch 7, a second conduit 202 communicating with the hydraulic servomotor 50 for the reduced-speed drive frictional engagement means or the multiple disc brake 5, a third conduit 203 communicating with the hydraulic servomotor 80 for the four-wheel drive frictional engagement means or the multiple disc clutch 8, a modulator valve 270 provided in the third conduit 203, a fourth conduit 204 communicating the change-over valve 230 with a predetermined oil chamber of the inhibitor valve 240, check valves 310, 320 and 330 provided in the first to third conduits, respectively, and conduit 205 of the first solenoid pressure and a conduit 206 of the second solenoid pressure communicating with conduit 104 through orifices 340 and 350, respectively.

The first and second solenoid valves 210 and 220 consist of a moving core 211 or 221, a solenoid 212 or 222, a spring 213 or 223, an opening 214 or 224 and a drain port 215 or 225, respectively. Upon energizing the solenoids 212 and 222, the moving cores 211 and 221 are moved in upper positions shown in the drawing to uncover the openings 214 and 224 to drain through the drain ports 215 and 225 the oil pressure in the conduits 205 and 26 which are partitioned off from conduit 104 by the orifices 340 and 350, respectively. When the solenoids 212 and 222 are in de-energized state, the moving cores 211 and 222 are displaced downward from the upper positions of FIG. 4 into the respective lower positions by the action of the springs 213 and 223 to close the openings 214 and 224 to generate a solenoid pressure of high level (line pressure) in the conduits 205 and 206.

As shown in FIG. 4, the inhibitor valve 240 is provided with three spools 241, 242 and 243 which are designated as first, second and third spools from the lower ones. The first spool 241 is provided with a spring-loaded sleeve-like land 245 at its lower end in addition to two lands 246 and 247, and formed with a lower oil chamber 248, first and second intermediate oil chambers 249 and 250 defined between the sleeve-like land 245 and the lands 246 and 247, an oil chamber 251 defined between the first and second spools 241 and 242, an oil chamber 252 defined between the second and third spools 242 and 243, and an upper oil chamber 253. When the first spool 241 of the inhibitor valve 240 is located in an upper position, above the illustrated position in FIG. 4, the lower oil chamber 248 is communicated with the governor pressure conduit 111 through an oil port 245A in the sleeve-like and 245, the first intermediate oil chamber 249 communicates the line pressure conduit 104 with the second conduit 202, and the second intermediate oil chamber 250 communicates the first conduit 201 with the drain port 256 or a fifth conduit 207. On the other hand, when the first spool 241 is held in the lower position shown, the lower oil chamber 248 communicates with the drain port 254 through the oil port 245A in the sleeve-like land 245, the first intermediate oil chamber 249 communicates the second conduit 202 with the drain port 255, and the second intermediate oil chamber 250 communicates the line pressure conduit 104 with the first conduit 201. The oil chamber 251, oil chamber 252 and upper oil chamber 253 are constantly in communication with the governor pressure conduit 111, the fourth conduit 204 and the conduit 206, respectively.

The change-over valve 230 is loaded with a biasing spring 232 as seen in the drawing on the lower end portion of a spool 231 which is provided with three lands, defining a lower oil chamber 233, a first intermediate oil chamber 234, a second intermediate oil chamber 235 and an upper oil chamber 236 from the lower ones. If the solenoid pressure of high level is applied to the upper oil chamber 236 which is in communication with conduit 205 of the first solenoid pressure, the spool 231 is displaced downward from the illustrated position in the drawing to assume a lower position, communicating the line pressure conduit 104 with the third conduit 203 through the second intermediate oil chamber 235 to supply the line pressure to the hydraulic servomotor 80 of the clutch 8, and communicating the fourth conduit 204 with a drain port 237 provided with an orifice 239 through the first intermediate oil chamber 234 to drain the oil chamber 252 of the inhibitor valve 240. If the solenoid pressure applied to the upper chamber 236 turns to low level, the spool 231 is displaced into the upper position as shown in the drawing by the action of the spring 232, communicating the line pressure conduit 104 with the fourth conduit 204 through the first intermediate oil chamber 234 to supply line pressure to the oil chamber 252 of the inhibitor valve 240, and communicating the third conduit 203 with a drain port 238 through the second intermediate chamber 235 to drain the hydraulic servo 80.

The down-shift timing valve 260 has a spring 262 disposed in the lower part thereof, as seen in the drawing, a spool 261 having two lands and three oil chambers arranged from the bottom to upward in the drawing, a bottom oil chamber 263, middle oil chamber 264 and top oil chamber 265. In the valve 260, the bottom oil chamber 263 is always in communication with the second conduit 202 while the top oil chamber 265 is always in communication with the line pressure conduit 104. The middle oil chamber 264 communicates always with the fifth conduit 207 and a drain port 266 provided with an orifice 267 for gradual draining, and further, with a drain port 268 when the spool 261 is set at the upper position for quick draining. The spool 261 is set at the upper position when the line pressure applied to the top chamber 265 is below the predetermined level, namely, when the throttle opening is small, hence the hydraulic pressure working on the spool 261 is smaller than the counterforce of the spring 262 or when the pressure for engaging the multiple disk brake 5 is applied to the bottom oil chamber 263.

The modulator valve 270 has a spring 272 disposed on the right-hand side thereof, in the drawing, a spool 271 having two lands and three oil chambers arranged from the right to the left, a right oil chamber 273, middle oil chamber 274 and left oil chamber 275. In the valve 270, the right oil chamber 273 communicates always with the second conduit 202, the middle oil chamber 274 intersects with the third conduit 203 and the left oil chamber 275 communicates with the third conduit 203 connecting with the hydraulic servomotor 80. When the pressure for engaging the brake 5 is applied to the right oil chamber 273, the third conduit 203 is fully opened, whereas the pressure within the third conduit 203 is regulated when the pressure for engaging the brake 5 is removed.

If the range of $H_2$ or $H_4$ or $L_4$ is selected by manipulation of a manual shift (a selector switch in this particular embodiment) which is provided in the driver's cabin, the first and second solenoid valves 210 and 220 are turned on or off as shown in Table 2 by the operation of an electric control circuit which will be described hereinafter, selectively supplying the operating oil pressure from the hydraulic control system of the torque transfer mechanism to the hydraulic servomotors 50, 70 and 80 of the respective frictional engagement means to change the transfer mechanism 10 into the gear position of the selected mode ($H_2$ or $H_4$ or $L_4$). In the above-described hydraulic circuit arrangement, if the first solenoid valve 210 is turned on, the transfer mechanism 10 is set in the gear position of $H_2$ mode irrespective of the on- or off-state of the second solenoid valve 220.

Table 2 below shows the on- and off-states of the first and second solenoid valves 210 and 220 in relation with the selected range of manual shift and the transfer gear position, wherein the symbol "ON" and "OFF" represent the energization and de-energization of the solenoid valve, respectively.

TABLE 2

| Manual valve selected range | Transfer manual shift | Solenoid valve 210 | Solenoid valve 220 | Gear position |
|---|---|---|---|---|
| D.2.L. | $H_2$ range | ON | OFF | $H_2$ |
| | $H_4$ range | OFF | OFF | $H_4$ |
| | $L_4$ range | OFF | ON | $H_4/L_4$ |
| N.P. | $H_2$ range | ON | OFF | $H_2$ |
| | $H_4$ range | ON | OFF | $H_2$ |
| | $L_4$ range | ON | ON | $H_2$ |

As clear from Table 2, upon energization of the first solenoid valve 210, the line pressure which is led from conduit 104 to conduit 205 through orifice 340 is drained through the drain port 215 to hold the spool 231 of the change-over valve 230 in the upper position shown, so that the oil pressure in the hydraulic servomotor 80 of the multiple disc clutch 8 is drained through the drain port 238 to release the clutch 8. The release of the multiple disc clutch 8 results in disconnection of the first output shaft 3 from the sleeve 9, namely, disconnection of the first output shaft 3 from the second output shaft 17, putting the transfer mechanism in the gear position of two-wheel drive mode. At the same time, the line pressure from conduit 104 is applied to the oil chamber 252 of the inhibitor valve 240 through the oil chamber 234 and the fourth conduit 204 to shift the first and second spools 241 and 242 of the inhibitor valve 240 into the respective lower positions shown, so that the line pressure of conduit 104 is fed to the hydraulic servomotor 70 through the oil chamber 250, first conduit 201 and check valve 310 to engage the multiple disc clutch 7, while the oil pressure in the hydraulic servomotor 50 is drained from the drain port 255 through the conduit 202 and oil chamber 249 to release the brake 5. As a result, the transfer mechanism 10 is held in the gear position of two-wheel drive direct-coupling range.

When the first solenoid valve 210 is in de-energized state, the line pressure of the conduit 104 is led to the conduit 205 through orifice 340, however, since the opening 214 of the first solenoid valve 210 is closed, it is admitted into the upper oil chamber 236 of the change-over valve 230, displacing the spool 231 into the lower position. Consequently, the line pressure of the conduit 104 is fed to the hydraulic servomotor 80 through the second intermediate oil chamber 235, third conduit 203 and check valve 330 to engage the multiple disc clutch 8. The engagement of the multiple disc clutch 8 connects the first output shaft 3 with the second output shaft 17 through the link mechanism to put the transfer mechanism in the gear position of four-wheel drive direct-coupling range. The communication between the fourth conduit 204 and 104 is blocked, the line pressure is not led in the oil chamber 252 of the inhibitor valve 240. Under these circumstances, if the second solenoid valve 220 is de-energized state, the line pressure of the conduit 104 is admitted into the upper oil chamber 253 of the inhibitor valve 240 through orifice 350 and conduit 206 to shift the third spool 243 of the inhibitor valve 240 into the lower position, holding the second and first spools 242 and 241 also in the respective lower positions. Accordingly, the line pressure is fed from the conduit 104 to the hydraulic servomotor 70 through the conduit 201 and check valve 310 to engage the multiple disc clutch 7, while the oil pressure in the hydraulic servomotor 50 is drained from the drain port 255 through the conduit 202 and oil chamber 249 to release the multiple disc brake 5, holding the transfer mechanism 10 in gear the position of $H_4$ (4-wheel drive direct-coupling) range.

If the second solenoid valve 220 is energized with the first solenoid valve 210 in de-energized state, the line pressure which is fed from the conduit 104 to conduit 206 through the orifice 350 is drained through the opening 224 and drain port 255, without being admitted into the upper oil chamber 253 of the inhibitor valve 240. Further, the first solenoid valve 210 is in de-energized state, so that no line pressure is supplied to the oil chamber 252 from the fourth conduit 204. The pressure receiving surface at the end of the first spool 241 of the inhibitor valve 240, which faces the oil chamber 251, has the same area as the pressure receiving surface at the lower end which faces the lower oil chamber 248. Therefore, in a case where the first spool 241 is in the lower position shown, namely, in the gear position of $H_4$ (4-wheel drive direct-coupling) range where the multiple disc clutch 7 is in engaged state and the multiple disc brake 5 is in released state, the first spool 241 is continuedly held in the lower position overcoming the force of the spring 244 to maintain the transfer mechanism in the gear position of $H_4$ (4-wheel drive direct coupling) range as long as the governor pressure supplied to the oil chamber 251 from the conduit 111 is greater than a predetermined level. However, if the governor pressure drops below the predetermined value, the first spool 241 is shifted into the upper position by the action of the spring 244, so that the governor pressure from the conduit 111 is also admitted into the lower oil chamber 248 through the oil port 245A of the sleeve-like land 245, retaining the first spool 241 in the upper position irrespective of variations in the governor pressure (i.e., in vehicle speed) thereafter. With the first spool 241 held in the upper position, the line pressure in conduit 104 is fed to the hydraulic servomotor 50 through the oil chamber 249, second conduit 202 and check valve 320 to engage the multiple disc brake 5, while the oil pressure in the hydraulic servomotor 70 is drained through conduit 201, oil chamber 250 and drain port 256 or the fifth conduit 207 to release the multiple disc clutch 7. Consequently, the transfer mechanism 10 is held in the gear position of $L_4$ range (reduced-speed four-wheel drive mode).

Namely, if the second solenoid valve 220 is energized when the first solenoid valve 210 is de-energized state and the governor pressure or the vehicle speed is lower than a predetermined value, the transfer mechanism 10 is immediately changed into the gear position of $L_4$ range (reduced-speed four-wheel drive mode). However, if the second solenoid valve 220 is energized when the governor pressure or the vehicle speed is higher than the predetermined value, the transfer mechanism 10 retains the gear position of $H_4$ (four-wheel drive direct-coupling) range until the governor pressure becomes lower than the predetermined value, and the transfer mechanism 10 is changed into the gear position of $L_4$ range after the governor pressure drops below the predetermined value.

Now, the operations are described in connection with the respective ranges which are selected by the manual valve 105 of the automatic transmission and the manual shift of the transfer mechanism.

(1) Where the manual valve 105 in D-, 2-, L- or R-range position, in which the governor pressure commensurate with vehicle speed is fed to the valve means:

(A) When the manual shift is in $H_2$ range and the transfer mechanism is in the gear position of $H_2$ range (two-wheel drive direct-coupling mode), the 1st solenoid valve 210 is "ON", and
the 2nd solenoid valve 220 is "OFF"

so that the line pressure in conduit 104 which is led to conduit 205 through orifice 340 is drained by the de-energized first solenoid valve 210, without being admitted into the upper oil chamber 236 of the change-over valve 230. Therefore, the spool 231 of the change-over valve 230 is held in the upper position by the spring 232, and the line pressure from conduit 104 is applied to the oil chamber 252 through the oil chamber 234 and fourth conduit 204, holding the second and first spools 242 and 241 of the inhibitor valve 240 in the respective lower positions. Consequently, the line pressure is fed to the hydraulic servomotor 70 of the clutch 7 from the conduit 104 through the oil chamber 250, first conduit 201 and check valve 310,. while the oil pressures in the hydraulic servomotors 80 and 50 are drained through the drain ports 238 and 255, respectively. Thus, the transfer mechanism 10 is set in the gear position of $H_2$ range (two-wheel drive direct-coupling mode).

(B) When the manual shift is in $H_4$-range and the transfer mechanism is in the gear position of $H_4$ range (four-wheel drive direct-coupling mode), the 1st solenoid valve 210 is "OFF", and
the 2nd solenoid valve 220 is "OFF38 so that the line pressure in the conduit 104 is led to the conduit 205 through orifice 340. However, since the first solenoid valve 210 is in de-energized state, the line pressure is admitted into the upper oil chamber 236 of the change-over valve 230, holding the spool 231 in the lower position. Consequently, the line pressure from the conduit 104 is fed to the hydraulic servomotor 80 of the clutch 8 through the second intermediate oil chamber 235, check valve 330, modulator valve 270 and third conduit 203. On the other had, the line pressure which is also led to the conduit 206 from the conduit 104 through orifice 350 is admitted into the upper oil chamber 253 since the second solenoid valve 220 is in de-energized state, holding the third, second and first spools 243, 242 and 241 of the inhibitor valve 240 in the respective lower positions. Therefore, the line pressure is fed to the hydraulic servomotor 70 of the clutch 7, and the oil pressure in the hydraulic servomotor 50 is drained through the drain port 255. Thus, the transfer mechanism 10 is set in the gear position of $H_4$ range (four-wheel drive direct-coupling mode).

(C) When the manual shift is in $L_4$-range with a vehicle speed higher than a predetermined value, and the transfer mechanism is in the gear position of $H_4$ range (four-wheel drive direct-coupling mode), the 1st solenoid valve 210 is "OFF", and
the 2nd solenoid valve 220 is "ON"

so that the line pressure of the conduit 104 which is led into the conduit 205 through orifice 340 prevails in the upper oil chamber 236 since the first solenoid valve 210 is in de-energized state, holding the spool 231 of the change-over valve 230 in the lower position. Accordingly, the line pressure is fed to the hydraulic servomotor 80 of the clutch 8. On the other hand, the line pressure which is also led into the conduit 206 from the conduit 104 through the orifice 350 is drained by the energized second solenoid valve 220, so that it is not admitted into the upper oil chamber 253 of the inhibitor valve 240. Also, the line pressure is not fed into the oil chamber 252 because the spool 231 of the change-over valve 230 is in the lower position. As the governor pressure prevails in the oil chamber 251, the second and third spools 242 and 243 are shifted to the respective upper positions. The governor pressure is in excess of the predetermined level, so that the first spool 241 is held in the lower position shown, overcoming the force of the spring 244. Therefore, the line pressure is fed to the hydraulic servomotor 70 of the clutch 7, and the oil pressure in the hydraulic servomotor 50 is drained through the drain port 255. Thus, the transfer mechanism 10 is set in the gear position of $H_4$ range (four-wheel drive direct-coupling mode).

(D) When the manual shift is in $L_4$-range with a vehicle speed lower than the predetermined value and the transfer mechanism is in the gear position of $L_4$ range (reduced-speed four-wheel drive mode), the 1st solenoid valve 210 is "OFF", and
the 2nd solenoid valve 220 is "ON"

so that the line pressure which is led from the conduit 104 into the conduit 205 through orifice 340 is admitted into the upper oil chamber 236 since the first solenoid valve 210 is in de-energized state, setting the spool 231 of the change-over valve 230 in the lower position shown. Consequently, the line pressure is fed into the hydraulic servomotor 80 of the clutch 8. On the other hand, the line pressure which is also led from the conduit 104 to the conduit 206 through orifice 350 is drained by the energized second solenoid valve 220. The line pressure is thus not admitted into the upper oil chamber 253 of the inhibitor valve 240. Also the line pressure is not fed into the oil chamber 252. In this instance, the governor pressure prevails in the oil chamber 251, the second and third spools 242 and 243 are shifted to the respective upper positions, and, since the governor pressure is lower than the predetermined level and overcome by the force of the spring 244, the first spool 241 is held in the upper position, admitting the governor pressure into the lower oil chamber 248 through the oil port 245A in the sleeve. Therefore, the line pressure is fed to the hydraulic servomotor 50 of the multiple disc brake 5 from the conduit 104 through oil chamber 249, second conduit 202 and check valve 320, while the oil pressure in the hydraulic servomotor 70 is drained through the first conduit 201, second intermediate oil chamber 250 and drain port 256, or through the oil chamber 250, intermediate oil chamber 264 of the downshift timing valve 260 and drain ports 266 and 268. Thus, the transfer mechanism is set in the position of $L_4$ range (reduced-speed four-wheel drive mode).

The upper and lower end faces of the first spool 241 of the inhibitor valve 240, which face respectively the oil chamber 251 and lower oil chamber 248, have the same pressure receiving areas, so that when the spool is shifted to the upper position, admitting the governor pressure into both the oil chamber 251 and the lower oil chamber 248, it will not be shifted to the lower position and held in the upper position by the action of the spring 244 even if the governor pressure (or the vehicle speed) is increased, until the manual shift is set in the $H_2$- or $H_4$-range position to admit the line pressure into the oil chamber 252 or into the upper oil chamber 253.

Therefore, in a case where the $L_4$-range is selected by the manual shift and established the gear position of $L_4$ range of the transfer mechanism upon a drop of the vehicle speed (or governor pressure) below a predetermined value, that gear position of $L_4$ range is maintained even after the vehicle speed (or governor pressure) is increased.

(2) Where the manual valve 105 in N- or P-range in which no governor pressure is fed to the valve means:

(E) When the manual shift selects $L_4$-range,
the 1st solenoid valve 210 is "ON", and
the 2nd solenoid valve 220 is "ON"

so that the line pressure which is led from the conduit 104 to the conduit 205 through orifice 340 is drained by the energized first solenoid valve 210, supplying no line pressure to the upper oil chamber 236. Therefore, the spool 231 of the change-over valve 230 is held in the upper position by the action of the spring 232, applying the line pressure to the oil chamber 252 of the inhibitor valve 240 from the conduit 104 through the oil chamber 234 and the fourth conduit 204, setting the second and first spools 242 and 241 of the inhibitor valve 240 in the respective lower positions. Consequently, the line pressure is fed to the hydraulic servomotor 70 of the clutch 7, and the oil pressure in the hydraulic servomotors 80 and 50 are drained through the drain ports 238 and 255, respectively. Thus, the transfer mechanism 10 is set in the gear position of $H_2$ range (two-wheel drive direct-coupling mode).

(F) When the manual shift selects $H_2$ range, or (G) When the manual shift selects $H_4$ range, the 1st solenoid valve 210 is "ON", and the 2nd solenoid valve 220 is "OFF"

so that the line pressure is admitted into the upper oil chamber 253 of the inhibitor valve 240 in addition to the conditions in (E). However, the change-over valve 230 and inhibitor valve 240 are operated in the same manner, supplying the line pressure to the hydraulic servomotor 70 of the clutch 7 and draining the hydraulic servomotors 50 and 80 to set the transfer mechanism in the gear position of $H_2$ range.

With the above-described transfer mechanism, if the range of reduced-speed four-wheel drive mode is selected by the manual shift of the transfer mechanism during a high speed operation of the vehicle in the mode of two-wheel drive direct-coupling mode ($H_2$) or four-wheel drive direct-coupling mode ($H_4$), the first and second solenoid valves 210 and 220 are put in de-energized state and energized state, respectively, as shown in Table 2. However, during the high speed operation of the vehicle in $H_2$ or $H_4$ mode, the second solenoid valve 220 has been in de-energized state with its first spool 241 held in the lower position, so that, even if the oil pressure in the upper oil chamber 253 is drained upon energization of the second solenoid valve 220, the governor pressure in the oil chamber 251 holds the spool 241 continuatively in the lower position, overcoming the force of the spring 244 as long as the vehicle speed is higher than the predetermined value. Therefore, the transfer mechanism is maintained in the gear position of $H_4$ range and not changed into $L_4$ range until the governor pressure drops below the predetermined level.

However, in a high speed operation of the vehicle where the transfer mechanism is established in $H_4$ range, if the manual shift of the automatic transmission is set in D-range after once setting the same in N-range in which the feeding of the governor pressure is stopped, the governor pressure which has been prevailing in the oil chamber 251 of the inhibitor valve 240 is drained at the time when the manual shift is set in the N-range position, as a result shifting the spool 241 to the upper position by the action of the spring 244. As soon as the manual shift is set in the D-range position, the governor pressure is admitted into the oil chamber 251 as well as the lower oil chamber 248 through the oil port 245A in the sleeve-like land to hole the spool 241 in the upper position. In such a case, the transfer mechanism 10 is changed into the gear position of reduced-speed four-wheel drive range $L_4$, abruptly changing the mode of operation of the vehicle to reduced speed four-wheel drive during operation abruptly from a high speed driving operation in $H_4$ range.

In order to avoid such dangerous situations, the electric control circuit employed by the present invention includes means for supplying the first solenoid valve 210 with a signal indicative of the selection of N- or P-range by the manual shift of the automatic transmission, thereby holding the first solenoid valve 210 in energized state to feed the line pressure to the hydraulic servomotor 70 of the multiple disc clutch 7 irrespective of the mode selected by the manual shift of the transfer mechanism, as will be described in greater detail hereinafter.

Figure 7:
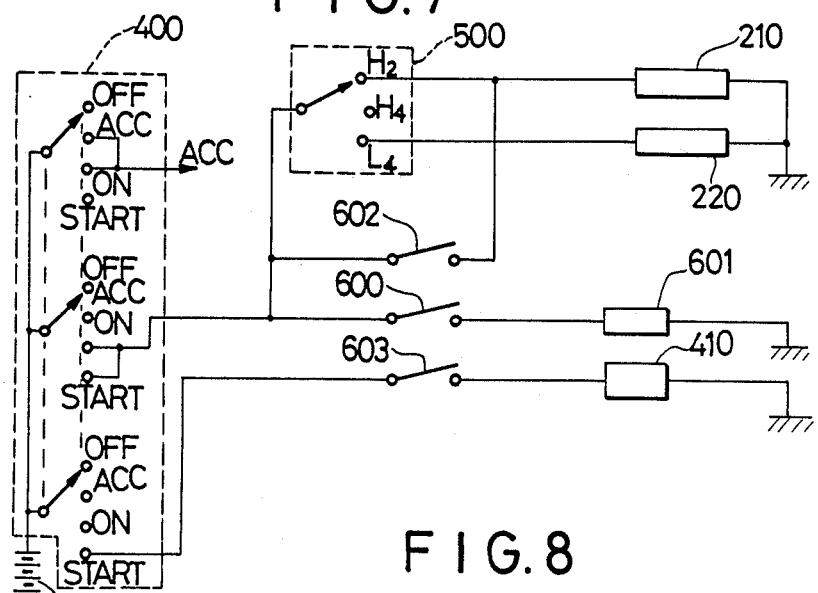
FIG. 7 is an electric circuit diagram of an electric control system for controlling the hydraulic control system.
Figure 8:
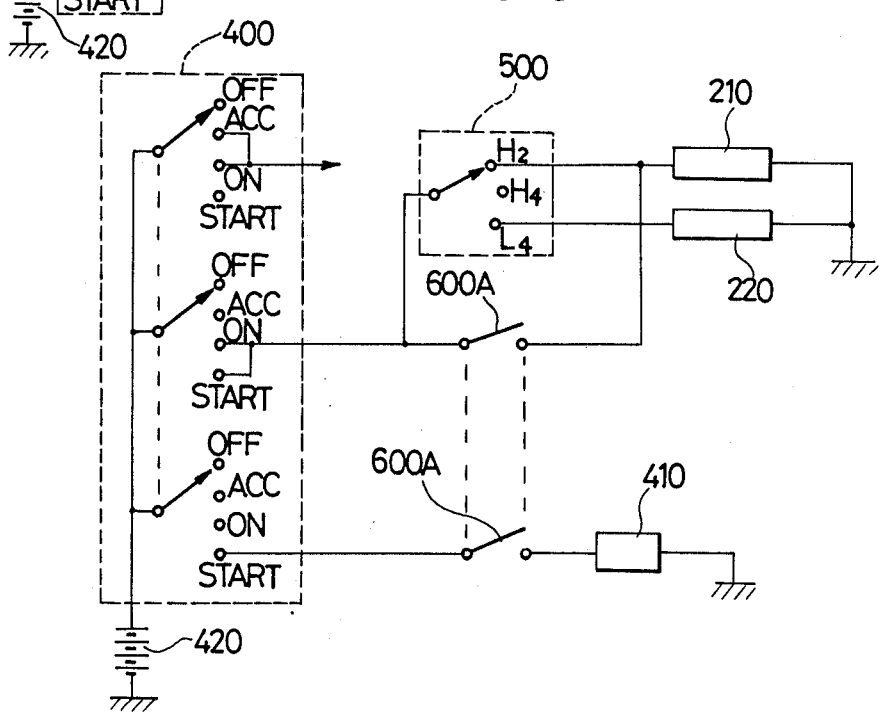
FIG. 8 is an electric circuit diagram of another electric control system for controlling the hydraulic control system.

FIGS. 7 and 8 illustrate Example 1 and 2, respectively, of the electric circuit which energizes and de-energizes the first and second solenoid valves 210 and 220 as shown in Table 2 according to the selected range selected by the manual selector valve 105 of the automatic transmission and the mode of operation selected by the manual shift of the transfer mechanism 10.

EXAMPLE 1

The electric circuit includes an ignition switch 400, a starter motor 410, a battery 420 and a manual shift or a selector switch 500 for the transfer mechanism 10. Indicated at 600 is a neutral safety switch which permits to start the internal combustion engine only in N- and P-ranges of the automatic transmission, and is turned on by the shift lever of the automatic transmission when the N- or P-range is selected thereby, actuating a relay 601 and closing relay contacts 602 and 603 to energize ("ON") the first solenoid valve 210 irrespective of the mode of operation ($H_2$-mode, $H_4$-mode and $L_4$-mode) selected by the selector switch 500.

EXAMPLE 2

In this case, the relay 601 and relay contacts 602 and 603 are omitted by the use of a safety switch 600A for two circuits.

While the present invention has been described in a preferred embodiment thereof, the present embodiment is illustrative and not restrictive and in a modification, a manual speed-selector valve for selectively controlling, through manual operation, the line pressure application to the respective input oil chambers of a selector valve and inhibitor valve (the top oil chamber 236 of the selector valve 230 and the top oil chamber 252 of the inhibitor valve 240, in the embodiment described hereinbefore) may be employed instead of those two solenoid valves 210 and 220.

The operation of the system in shifting from the mode (A), (B) or (C) to the mode (D) will be described hereinafter with reference, mainly, to the operation of the inhibitor valve 240 and the down-shift timing valve 260.

When the mode (A) or (B) is shifted to mode (C), namely, when the transfer mechanism is shifted from the $H_2$ range or the $H_4$ range to the $L_4$ range while the vehicle is running at a running speed below a given running speed, and when the mode (C) is shifted to the mode (D), namely, when the transfer mechanism is shifted manually to the $L_4$ range and the running speed of the vehicle, which has been running at a running speed above the given running speed with the transfer mechanism in $H_4$ range, is reduced to a running speed below the given running speed, the first spool 241 of the inhibitor valve 240 is moved to the upper position due to the operation of the first and second solenoid valves 210 and 220 and/or the reduction in the governor pressure. Consequently, the hydraulic servomotor 70 is drained through the first conduit 201, the second middle oil chamber 250, the fifth conduit 207, the middle oil chamber 264 and the drain ports 266 and 268 so that the direct-coupling multiple disk clutch 7 is disengaged and at the same time, the line pressure is applied to the hydraulic servomotor 50 and to the bottom oil chamber 262 of the down-shift timing valve 260 through the conduits 104, first middle oil chamber 249 and the second conduit 202 provided with a check valve 320 therein so that the reduced-speed drive multiple disk brake 5 is engaged and the spool 261 of the timing valve 260 is moved to the upper position.

Figure 5:
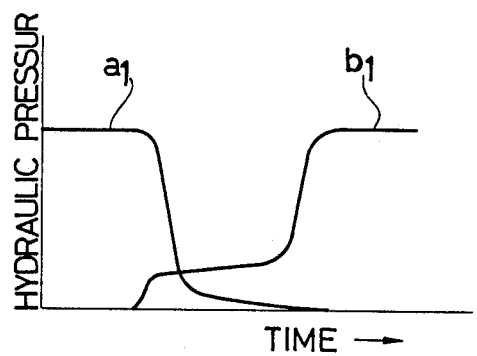
FIG. 5 is a graph showing the variation of the respective hydraulic pressures working in the hydraulic servomotor 50 and the hydraulic servomotor 70 with time during a down-shift operation when the line pressure is lower than a predetermined pressure level.

In the operation as described hereinbefore, (1) When the line pressure is lower than a predetermined level (small throttle opening);

Since a low line pressure is applied to the top oil chamber 265 of the timing valve 260 through the conduit 104, the spool 261 is moved to the upper position by the spring 262 allowing the fifth conduit 207 for draining the hydraulic servomotor 70 communicate with the first and second drain ports 266 and 268 so that the hydraulic servomotor 70 is drained quickly. Accordingly, the oil pressure $a_1$ in the hydraulic servomotor 50 and the oil pressure $b_1$ in the hydraulic servomotor 70 vary with time as shown in FIG. 5.

Figure 6:
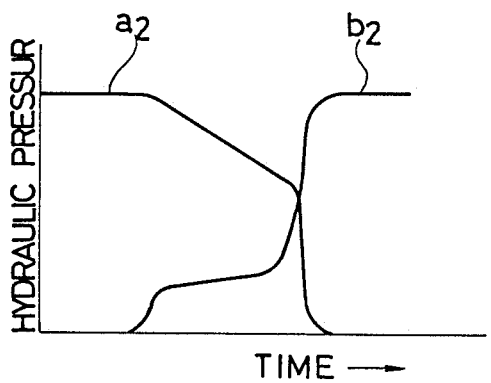
FIG. 6 is a graph showing the variation of the respective oil pressures working in the hydraulic servomotor 50 and the hydraulic servomotor 70 with time during a down-shift operation when the line pressure is higher than the predetermined pressure level.

(2) The line pressure is higher than the predetermined level (large throttle opening);

Since a high line pressure is applied to the top oil chamber 265 of the timing valve through the conduit 104, the spool 261 is moved to the lower position against the force of the spring 262. In the initial stage, the hydraulic servomotor 70 is drained gradually only through the drain port 266 provided with the orifice 267. When the pressure for engaging the multiple disk brake 5 is applied to the bottom oil chamber 263 through the conduit 202, the hydraulic pressure working in the top oil chamber 265 is balanced with the hydraulic pressure working in the bottom oil chamber 263. Consequently, the spool 261 is moved to the upper position by the spring 262 so that the fifth conduit 207 is allowed to communicate with, in addition to the first drain port 266 provided with the orifice 267, the second drain port 268 so that the hydraulic servomotor 70 is drained quickly. Accordingly, the oil pressure $a_2$ in the hydraulic servomotor 70 and the oil pressure $b_2$ in the hydraulic servomotor 50 vary with time as shown in FIG. 6.

As described hereinbefore, since the shift timing in shifting the transfer mechanism from the $H_2$ or $H_4$ range to the $L_4$ range is controlled when the throttle opening is small (for example, while running along a level road) so that the reduced-speed drive brake 5 is engaged after the direct drive clutch 7 has been disengaged, shocks resulting from the shifting operation can favorably be reduced. On the other hand, since the operation of engaging the reduced-speed drive brake 5 overlaps with the operation of disengaging the direct-coupling clutch 7 when the throttle opening is large (for example, when the transfer mechanism is shifted from the $H_4$ range to the $L_4$ range while running up a steep slope to provide a greater driving force), the transfer mechanism is shifted without becoming neutral state, which ensures safe running.

The function of the modulator valve 270 will be described hereinafter.

When the vehicle is running with the transfer mechanism shifted into $H_4$ range (four-wheel direct-coupling drive range) by shifting the manual shift lever to the $H_4$ position (or $L_4$ position), namely, in the (B) or (C) mode, the right oil chamber 273 of the modulator valve 270 is drained and the third conduit 203 intersecting the middle oil chamber 274 is choked with the spool 271, the position of which is dependent on the balance between the force of the spring 272 and the hydraulic force working in the left oil chamber 275. Consequently, the engaging pressure applied to the hydraulic servomotor 80 is reduced and the torque capacity of the four-wheel drive clutch 8 thereby is reduced, therefore, the clutch 8 slips to absorb a torsion when the torsional stress resulting from the differential revolving rate between the front and rear wheels exceeds the torque capacity of the clutch 8.

When the manual shift lever is adjusted to the $L_4$ position and the vehicle is running with the transfer mechanism shifted into the $L_4$ range (reduced-speed four-wheel drive range), namely, when in the (D) mode, the engaging pressure of the reduced-speed drive brake 5 the level of the line pressure) is applied to the right oil chamber 273 of the modulator valve 270 and the spool 271 is moved to the left position by the spring 272 to open fully the third conduit 203 intersecting the middle oil chamber 274 so that the engaging pressure in the level of the line pressure is applied to the hydraulic servomotor 80 to provide an increased torque capacity for the four-wheel drive clutch 8. Consequently, sufficient four-wheel driving force is provided.

As described hereinbefore, the present invention provides a hydraulic control system for a four-wheel drive torque transfer mechanism which is connected to the rear end of an automatic transmission, has a reduction gear mechanism, direct-coupling frictional engagement means, reduced-speed drive frictional engagement means and four-wheel drive frictional engagement means and is capable of being shifted into gear positions of a two-wheel drive direct-coupling mode, four-wheel drive direct-coupling mode and reduced-speed four-wheel drive mode, including means to reduce the coupling torque of the four-wheel drive frictional engagement means, which engages in the four-wheel drive mode and disengages in the two-wheel drive mode when the transfer mechanism is shifted into the gear position of the four-wheel drive direct-coupling mode and to increase sufficiently the coupling torque of the same when the transfer mechanism is shifted into the gear position of the reduced-speed four-wheel drive mode so that a tortional force resulting from a differential in revolving rate between the front and rear axles is absorbed through the slipping operation of the four-wheel drive frictional engagement means in the four-wheel drive direct-coupling mode, whereas a sufficient four-wheel driving force is provided in the reduced-speed four-wheel drive mode, and thus capable of controlling the transfer mechanism to allow the front and rear wheels to secure driving force corresponding to the running condition during four-wheel drive running, while reducing the four-wheel drive transfer mechanism to an extremely simple constitution.

Furthermore, with the manual shift of the transfer mechanism shifted to L₄ range, the second control valve means maintains the engagement of the direct-coupling frictional engagement means engaged under the action of a speed signal applied thereto when the vehicle speed is high, whereas the second control valve means disengages the direct-coupling frictional engagement means and engages the reduced-speed drive frictional engagement means and at the same time, increases the coupling torque of the reduced-speed drive frictional engagement means when the vehicle speed is reduced below a predetermined speed. Thus, an appropriate driving force is provided corresponding to the running condition of the vehicle.

What is claimed is:

1. A hydraulic control system for four-wheel drive torque transfer mechanism for a vehicle, comprising:
    an automatic transmission;
    a transfer mechanism connected to the output end of said automatic transmission, including a four-wheel drive frictional engagement means with a hydraulic servomotor, direct-coupling drive frictional engagement means and reduced-speed drive frictional engagement means for selectively establishing said transfer mechanism in one of a two-wheel drive direct-coupling gear, a four-wheel drive direct-coupling gear and a reduced-speed four-wheel drive gear; and
    a hydraulic control circuit including at least a source of pressurized fluid at a line pressure and valve means to apply the line pressure to the hydraulic servomotor for said four-wheel drive frictional engagement means when said transfer mechanism is established in the reduced-speed four-wheel drive gear and to apply a reduced pressure less than the line pressure to the hydraulic servomotor for the four-wheel drive frictional engagement means when said transfer mechanism is established in the four-wheel drive direct-coupling gear whereby the reduced pressure applied to the hydraulic servomotor in the four-wheel drive direct-coupling gear allows for slipping operation of the four-wheel drive frictional engagement means, thereby absorbing a tortional force resulting from a differential in revolving rates between a front and a rear axle, the line pressure applied to the hydraulic servomotor in the reduced-speed four-wheel drive gear preventing slipping operation.

2. A hydraulic control system for a four-wheel drive transfer mechanism for vehicles having a gear positions of a two-wheel drive direct-coupling mode, a four-wheel drive direct-coupling mode and a reduced-speed four-wheel drive mode, comprising:
    an automatic transmission having an output end;
    a transfer mechanism including a reduction gear mechanism having an input end and an output end, said input end thereof being connected to the output end of said transmission, a first output shaft connected to the output end of said reduction gear mechanism, a second output shaft rotatably connected and disconnected to said first output shaft through a linkage and a first frictional engagement means, a second frictional engagement means for coupling and uncoupling the input end of said reduction gear mechanism to said first output shaft, and a third frictional coupling means for establishing said reduction gear mechanism in the reduced-speed drive mode; and
    a hydraulic control circuit comprising a source of pressurized fluid, a first control valve means for selectively supplying said pressurized fluid to a hydraulic servomotor of said first frictional engagement means under the control of a range signal corresponding to a range selected by a manual shift of said transfer mechanism, a second control valve means for selectively supplying the pressurized fluid to a hydraulic servomotor of either said second or third frictional engagement means under the control of said range signal, and a third control valve means provided in a fluid conduit connecting said first control valve means and the hydraulic servomotor of said first frictional engagement means and adapted to control the sectional area of said fluid conduit under the control of the fluid pressure working within the hydraulic servomotor of said third frictional engagement means, said third control valve means reducing the sectional area of said fluid conduit when the fluid pressure within the hydraulic servomotor of said third frictional engagement means is absent as compared to the sectional area of said fluid conduit when the fluid pressure is present within the hydraulic servomotor of said third frictional engagement means to apply a reduced fluid pressure to the hydraulic servomotor of said first frictional engagement means.

3. A hydraulic control system according to claim 2, wherein said third control valve means is a modulator valve including a slidable spool which is moved by receiving the fluid pressure working within the hydraulic servomotor of said third frictional engagement means at a first end thereof and the fluid pressure working within the hydraulic servomotor of said first frictional engagement means at a second end thereof and is adapted to regulate through the movement thereof the sectional area of a fluid conduit connecting said first control valve means and the hydraulic servomotor of said first frictional engagement means.

4. A hydraulic control system according to claim 3, wherein said modulator valve has a slidable spool having two lands, a first pressure chamber formed at one end of said spool for receiving the fluid pressure working within the hydraulic servomotor of said third frictional engagement means, a second pressure chamber formed at a second end of said spool for receiving the fluid pressure working within the hydraulic servomotor of said first frictional engagement means, a spring disposed within said first pressure chamber, and ports for allowing a fluid chamber formed between said two lands to communicate with said first control valve means and the hydraulic servomotor of said first frictional engagement means, and either of said two lands is adapted to choke either of said ports.

5. A hydraulic control system according to claim 4, wherein said hydraulic control circuit further includes means for generating a speed signal having a component commensurate with a cruising speed of said vehicle, said second control valve means is an inhibitor valve interposed between said pressurized fluid source and the respective hydraulic servomotors of said second and third frictional engagement means, said inhibitor valve including a slidable spool to receive said speed signal at a first end thereof and biased with a spring at a second end thereof, said spool being adapted to be placed at a first position allowing a first fluid conduit connected to the hydraulic servomotor of said second frictional engagement means to communicate with said pressurized fluid source and also allowing a second fluid conduit connected to the hydraulic servomotor of said third frictional engagement means to communicate with a draining conduit when said speed signal is greater than a predetermined value and to be placed at a second position allowing said second fluid conduit to communicate with said pressurized fluid source and also allowing said first fluid conduit to communicate with a draining conduit when said speed signal is smaller than a predetermined value, said first control valve means is a change-over valve interposed between said pressurized fluid source and the hydraulic servomotor of said first frictional engagement means through at third fluid conduit and including a spool to receive one of said range signals at a first end thereof and biased with a spring at a second end thereof, said spool being adapted to be placed at a first position allowing said third fluid conduit connecting the hydraulic servomotor of said first frictional engagement means to communicate with said pressurized fluid source through said change-over valve when said range signal is applied thereto and to be placed at a second position allowing said third fluid conduit to communicate with a drain conduit when said range signal is absent.

6. A hydraulic control system according to claim 5, wherein said change-over valve further includes a port to allow said pressurized fluid source to communicate with a fourth fluid conduit when the spool thereof is at the second position, said inhibitor valve has a second spool and third spool in addition to said first spool coaxially with said first spool and a port to communicate with said fourth fluid conduit, said second spool being adapted to receive the speed signal applied to said first spool at one end thereof and to receive the pressure of said pressurized fluid source through said fourth fluid conduit at the other end thereof for sliding movement, and said third spool being adapted to receive the pressure of said pressurized fluid source through said fourth fluid conduit at one end thereof and to receive one of said range signals at the other end thereof for sliding movement.

7. A hydraulic control system according to claim 6, wherein said hydraulic control circuit further includes a fourth control valve means for controlling the flow rate through the draining conduit of said first fluid conduit, and said fourth control valve means is a down-shift timing valve having a spool adapted to receive a line pressure of said hydraulic control circuit at one end thereof and the fluid pressure prevailing within said second fluid conduit at the other end thereof for sliding movement, and capable of functioning so as to provide a increased sectional area for said draining conduit when said line pressure is below a predetermined level and to provide a reduced sectional area for said draining line when said line pressure is above said predetermined level.

* * * * *